(12) United States Patent
Gokam et al.

(10) Patent No.: US 10,353,714 B1
(45) Date of Patent: Jul. 16, 2019

(54) NON-DISRUPTIVE UPGRADE OF MULTIPATH DRIVERS IN INFORMATION PROCESSING SYSTEM

(71) Applicant: EMC IP Holding Company LLC, Hopkinton, MA (US)

(72) Inventors: Kurumurthy Gokam, Bangalore (IN); Gopinath Marappan, Bangalore (IN); Madhu L. Tarikere, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/869,826

(22) Filed: Jan. 12, 2018

(51) Int. Cl.
*G06F 9/44* (2018.01)
*G06F 9/4401* (2018.01)
*G06F 13/42* (2006.01)
*G06F 3/06* (2006.01)

(52) U.S. Cl.
CPC ............ *G06F 9/4411* (2013.01); *G06F 3/067* (2013.01); *G06F 3/0607* (2013.01); *G06F 3/0635* (2013.01); *G06F 3/0665* (2013.01); *G06F 3/0689* (2013.01); *G06F 13/4282* (2013.01)

(58) Field of Classification Search
CPC .... G06F 9/4411; G06F 3/0607; G06F 3/0635; G06F 3/0665; G06F 3/067; G06F 3/0689; G06F 13/4282
See application file for complete search history.

(56) References Cited

U.S. PATENT DOCUMENTS

| | | | |
|---|---|---|---|
| 7,890,664 B1 | 2/2011 | Tao et al. | |
| 2007/0174849 A1* | 7/2007 | Cheung | G06F 8/656 719/321 |
| 2010/0313063 A1* | 12/2010 | Venkataraja | G06F 9/5022 714/4.1 |
| 2014/0105068 A1* | 4/2014 | Xu | H04L 67/34 370/255 |

* cited by examiner

*Primary Examiner* — Henry Tsai
*Assistant Examiner* — John B Roche
(74) *Attorney, Agent, or Firm* — Ryan, Mason & Lewis, LLP (57) ABSTRACT

Techniques are provided to enable non-disruptive upgrades of multipath device drivers. A multipath device driver includes a core module and a thin module. The core module is configured to implement all multipathing functionality of the multipath device driver, and the thin module is configured to create and maintain an instance of a multipath device, which is utilized by the core module to control I/O operations over a plurality of I/O paths from the host system to an array of data storage devices. In response to an upgrade command, the thin module replaces I/O entry points of the core module so that I/O operation requests are routed to the thin module during an upgrade operation of the core module. The thin module utilizes the instance of the multipath device during the upgrade operation to execute the I/O operation requests that are routed to the thin module.

20 Claims, 5 Drawing Sheets

NON-DISRUPTIVE UPGRADE OF MULTIPATH DRIVERS IN INFORMATION PROCESSING SYSTEM

FIELD

The field relates generally to information processing systems, and more particularly to systems and methods for enabling multipath device driver upgrades in information processing systems.

BACKGROUND

Multipath device driver software is utilized to manage multiple I/O (input/output) paths through an information processing system. A host can have multiple storage LUNs connected from a storage array. Each storage LUN can have multiple I/O paths from the host to the storage array. A multipathing driver groups all such I/O paths from a host to each array LUN into logical devices known as multipath devices. Each individual block device representing each I/O path is referred to as a native device. Applications running on a host system utilize multipath devices for I/O operations so that the I/O operations can be distributed across all available I/O paths. In this regard, multipathing is utilized to support load balancing to increase efficiency of I/O operations, and to provide failover in response to component failure (e.g., I/O adapter failure).

In conventional systems, when a new multipath device driver upgrade is needed, the applications which utilize the associated multipath device for I/O operations must be stopped to perform the driver upgrade, and then restarted after the driver upgrade process is completed. Indeed, since the multipath device is an entity created by the multipath device driver, the multipath device driver cannot be unloaded and upgraded without first terminating the multipath device. Due to these challenges, an upgrade of a multipath device driver requires application downtime and/or a reboot of the host system, which can significantly impact system operation.

SUMMARY

Illustrative embodiments include systems and methods to enable non-disruptive upgrades of multipath device drivers. In one embodiment, a method comprises: running a multipath device driver on a host system, wherein the multipath device driver comprises a core multipath device driver module and a thin multipath device driver module, wherein the core multipath device driver module is configured to implement all multipathing functionality of the multipath device, and wherein the thin multipath device driver module is configured to create and maintain an instance of a multipath device, which is utilized by the core multipath device driver module to control input/output (I/O) operations over a plurality of I/O paths from the host system to an array of data storage devices of a data storage system; receiving, by the core multipath device driver module, an upgrade command from an operating system of the host system; sending an upgrade notification from the core multipath device driver module to the thin multipath device driver module; responsive the upgrade notification, the thin multipath device driver module replacing I/O entry points of the core multipath device driver module so that I/O operation requests are routed to the thin multipath device driver module during an upgrade operation of the core multipath device driver module; and utilizing, by the thin multipath device driver module, the instance of the multipath device during the upgrade operation to execute the I/O operation requests that are routed to the thin multipath device driver module. In some embodiments, the instances of multipath devices are not destroyed and recreated, but rather maintained across the driver upgrade process.

These and other illustrative embodiments include, without limitation, apparatus, systems, methods and computer program products comprising processor-readable storage media.

DETAILED DESCRIPTION

Illustrative embodiments will now be described in further detail with regard to systems and methods that are configured to enable non-disruptive upgrades of multipath device drivers by retaining an existing multipath device and redirecting I/O operations. As explained in further detail below, a non-disruptive upgrade of a multipath device driver is realized by dividing the multipath device driver into a core multipath device driver module and a thin multipath device driver module. The core multipath device driver module comprises full multipathing functionality such as failover, load balancing, etc., while the thin multipath device module comprises basic intelligence to create a multipath device with the assistance of the core multipath device driver module, and manage I/O operations using a mapping table during an upgrade of the core multipath device driver module. During normal operations, the I/O will pass through the core multipath device driver module and not the thin multipath device driver module. When a multipath device driver upgrade operation is to be performed, the thin multipath device driver module will replace I/O entry points so that I/O operations will be intercepted by the thin multipath device driver module. The thin multipath device driver module will redirect the I/O operations from the multipath device to native devices directly, while bypassing the core multipath device driver module. Since the core multipath device driver module is not utilized, the core multipath device driver module can be unloaded and a newer version of the core multipath device driver module can be installed. The thin multipath device driver module will then replace the I/O entry points to that of the new core multipath device driver module and subsequent I/O operations will be handled by the core multipath device driver module directly.

The multipath device instances are not destroyed and recreated, but rather are maintained across the driver upgrade.

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
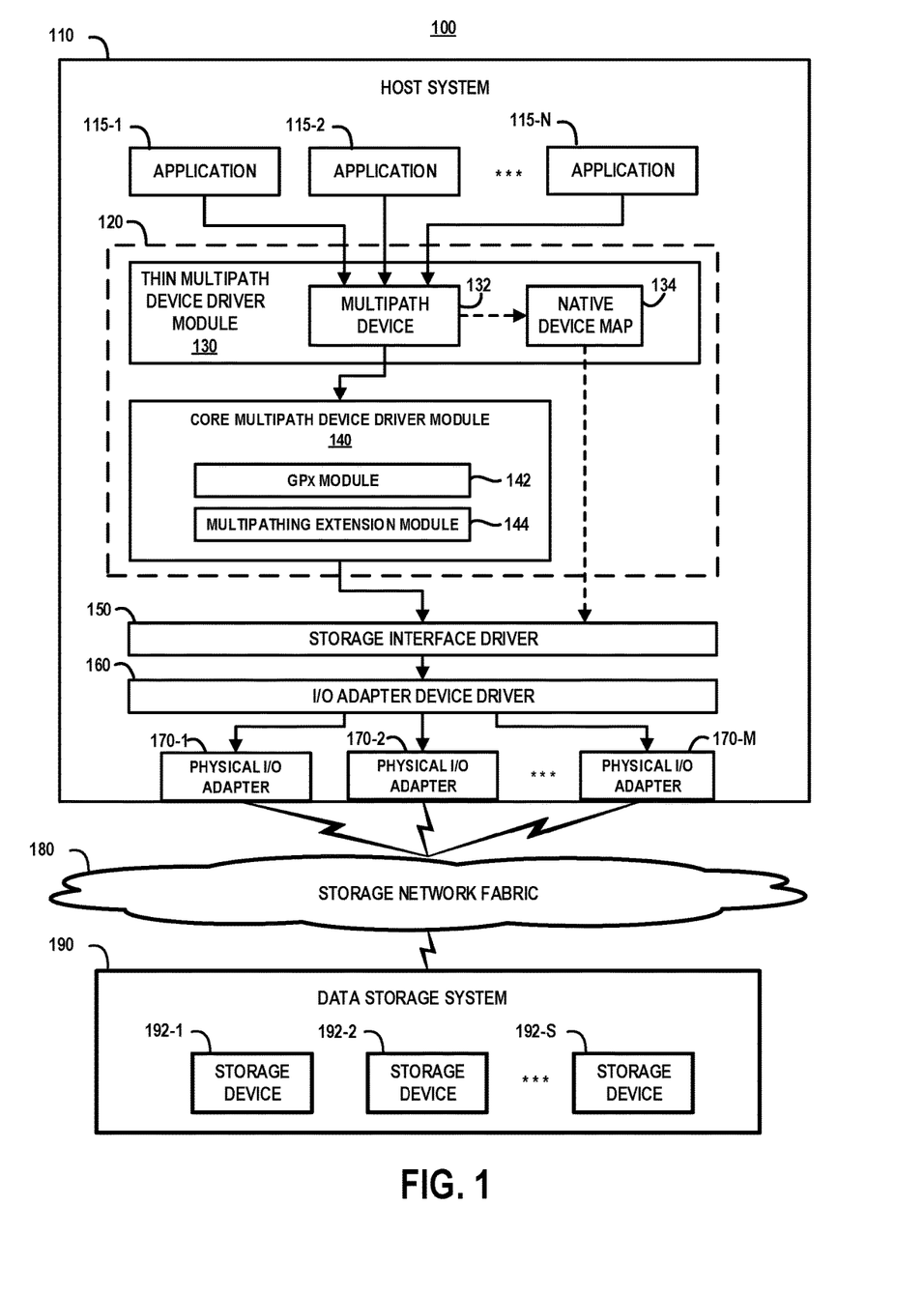
FIG. 1 is a block diagram of an information processing system comprising a host system which is configured to enable non-disruptive upgrades of a multipath device driver, according to an embodiment of the invention.

FIG. 1 is a block diagram of an information processing system 100 comprising a host system 110 which is configured to enable non-disruptive upgrades of a multipath device driver, according to an embodiment of the invention. The host system 100 is configured to host a plurality of applications 115-1, 115-2, . . . , 115-N (collectively referred to as applications 115) which are executed by the host system 100. The applications 115 may comprise different types of applications such as bare metal applications, container applications, virtual machine applications which execute on virtual machines, or any combination of different types of applications. The host system 110 further comprises a multipath device driver 120, which comprises a thin multipath device driver module 130 (or "thin module"), and a core multipath device driver module 140 (or "core module"). The thin module 130 creates and maintains at least one multipath device 132 and a native device mapping table 134. The core module 140 implements various application programming interface (API) modules 142 and 144 to support multipathing functions. The host system 110 further comprises a storage interface driver 150, an I/O adapter device driver 160, and a plurality of physical I/O adapters 170-1, 170-2, . . . , 170-M (collectively I/O adapters 170).

The API module 142 may be implemented using the General Purpose Extension module which is part of the Dell ECM PowerPath family of software products to support multipathing functionality, such as optimizing I/O paths in physical and virtual environments, adjusting I/O paths to dynamically rebalance the application environment for peak performance, providing failover and recovery management to route application requests to alternative resources in the event of component failures or user errors, etc. Further, the API module 144 can be implemented using the Dell EMC Multipathing Extension Module (MEM) for VMware® vSphere®, so support multipath I/O access to PS Series storage systems.

The information processing system 100 further comprises a storage network fabric 180 and a data storage system 190, which is network connected to the host system 110 via the storage network fabric 180. The data storage system 190 comprises a plurality of storage devices 192-1, 192-2, . . . , 192-S (collectively, storage devices 192). In one embodiment, the data storage system 190 comprises a storage area network (SAN) which includes a storage array implemented by the storage devices 192. In one embodiment, the storage devices 192 are configured as a storage array of hard disk drives (HDDs), which provides a repository for data which is utilized by the host system 110. In a SAN system, the data within a disk array is typically organized into Logical Units (LUs), wherein storage I/O commands (e.g., Small Computer Systems Interface (SCSI) I/O commands, or other storage interface protocols) are sent to a storage target and executed by an LU within that target. A Logical Unit Number (LUN) is a unique identifier that is used to distinguish between separate devices, or logical units, that share the same bus (e.g., SCSI bus). A LUN can represent a single HDD, a portion of an HDD, or a full storage array. The storage I/O commands that are sent to a data storage controller (e.g., SCSI controller) utilize LUNs to identify target storage devices.

The storage interface driver 150 is configured to control data access operations for storing or accessing data to and from the storage devices 192 of the data storage system 190. In one embodiment, the storage interface driver 150 implements a SCSI protocol, although other types of storage interface protocols such as Fibre Channel, serial attached storage (SAS/SATA), etc., can be implemented depending on the system architecture. The I/O adapter device driver 160 implements multiple instances of I/O adaptor device drivers to control the physical I/O adapters 170-1, 170-2, . . . , 170-M (e.g., there is one instance of an I/O adaptor device driver for each physical I/O adapter 170. The physical I/O adapters 170 provide the physical I/O processing and connectivity between the host system 110 and the storage devices 192 of the data storage system 190. The physical I/O adapters 170 can be implement using, e.g., network interface cards (NICs), converged network adapter cards, host bus adapter (HBA) cards, or other types of devices for physically connecting the host system 110 to the data storage system 190 through the storage network fabric 180.

The multipath device driver 120 is configured to provide multiple storage I/O paths from a given application 115 to the storage devices 192 of the data storage system 190. The native device mapping table 134 comprises a data structure which comprises a mapping of all I/O paths from the host system 110 to the LUNs. As noted above, the multipathing device driver 120 groups all I/O paths from a host to each array LUN into logical devices known as multipath devices. Each individual block device representing each I/O path is referred to as a native device. During normal operation (when no multipath device driver upgrade is being performed), the core multipath device driver module 140 is configured to implement all multipathing functionality of the multipath device driver 120, wherein the core multipath device driver module 140 utilizes the multipath device 132 to control I/O operations over a plurality of I/O paths from the host system 100 to the array of data storage devices 192 of the data storage system 190. The particular I/O path chosen for accessing the storage devices 192 is determined by the core multipath device driver module 140. The core multipath device driver module 140 will add routing information to I/O operation requests to ensure proper routing of the I/O operation requests through the I/O selected path to a target storage device 192.

Although one instance of a multipath device 132 is shown in FIG. 1 for ease of illustration, in one embodiment, there is one instance of a multipath device 132 created for each LUN in the data storage system 190 connected to the host system 110. For example, there can be ten (10) LUNs connected to the host system 110, in which case there will be ten (10) instances of the multipath device 132 created by the multipath device driver 120. Further, each LUN can be presented through multiple I/O paths. For example, each LUN can be accessed through four I/O paths. In that case, there will be four native devices for each LUN, for a total of 10×4=40 native devices on the host system 110. The instances of the multipath device 132 are created one time by the multipath device driver 120 and are retained and utilized during an upgrade of the core multipath device driver module 140 using methods as discussed in further detail below.

During normal operation, when a given application 115 sends an I/O operation request to the multipath device driver 120, the core multipath device driver module 140 will select an I/O path for the I/O operation request, and send the I/O operation request to the appropriate instance of the storage interface driver 150. The storage interface driver 150 converts the I/O operation request into one or more appropriate I/O command for the target storage device 192. The storage interface driver 150 sends the I/O commands to a target instance of the I/O adapter device driver 160, and the I/O adapter device driver 160 transmits the I/O operation request to an appropriate port of the data storage system 190 via one of the physical I/O adapters 170. For example, in one embodiment, the I/O operation request specifies a target LUN of a storage device 192 which is the target of the I/O operation request.

There are two I/O entry points implemented by the multipath device driver 120, one entry point in the thin module 130 and one entry point in the core module 140. These entry points are commonly known as "strategy routines" in Linux. A strategy routine is essentially a link between the multipath device driver 120 and an instance of the I/O adapter device driver 160 for all normal I/O requests. Whenever the multipath device driver 120 receives a call, it builds a certain data structure (e.g., scsi_buf structure) with requisite parameters, and then passes the data structure to the strategy routine, which in turn queues the I/O request for processing. During normal operations, the strategy routine of the core module 140 is utilized by all instances of the multipath device 132, while the strategy routine of the thin module 130 will remain idle. As such, during normal operations, all I/O operations to the multipath device 132 will go directly to the core module 140, and therefore will have full multipathing functionality.

However, during an upgrade operation wherein the core module 140 is unloaded and replaced with a new core module, the instances of the multipath device 132 are maintained, and the strategy routine of the thin module 130 is utilized by the multipath device 132 instances such that I/O operations to the multipath device 132 will go directly to the thin module 130, bypassing the core module 140 (as schematically illustrated by the dashed arrow in FIG. 1 from the thin module 130 to the storage interface driver 150). Various operating modes of the multipath device driver 120 will now be discussed in further detail with reference to FIGS. 2, 3 and 4.

Figure 2:
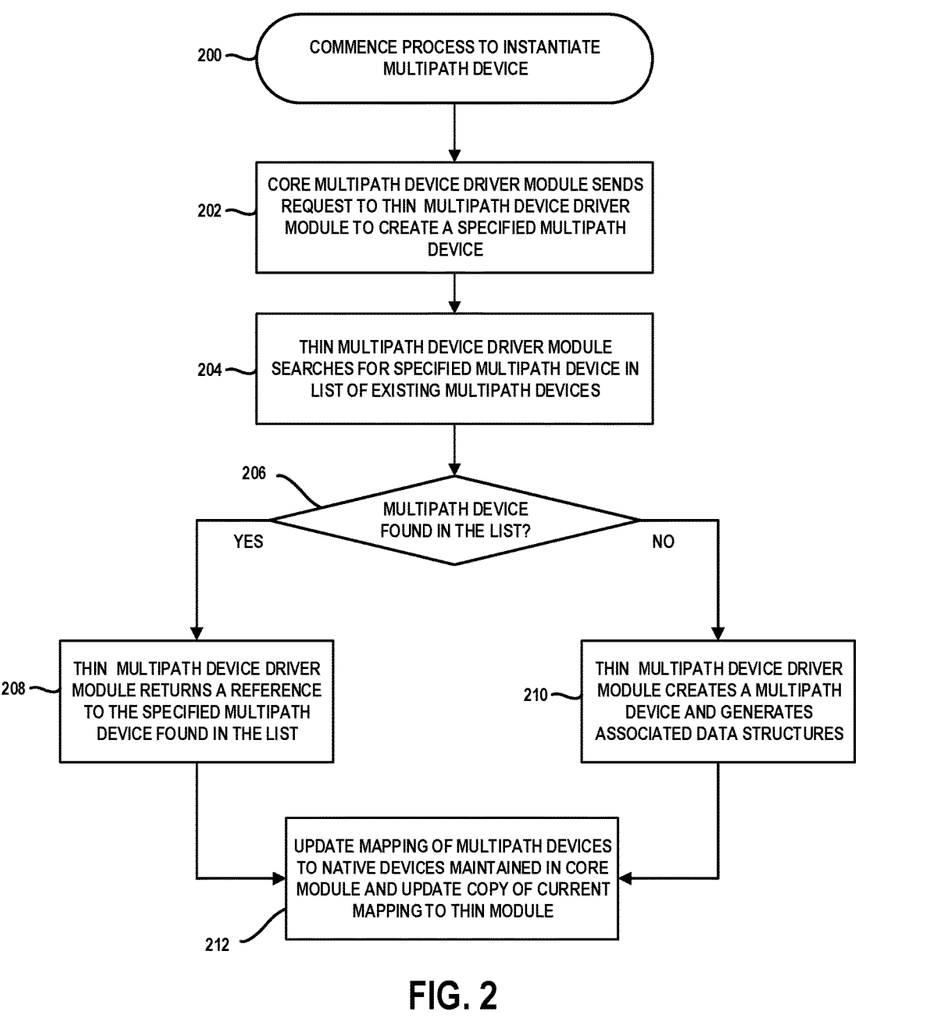
FIG. 2 is a flow diagram of a method implemented by a multipath device driver to create a multipath device, according to an embodiment of the invention.

FIG. 2 is a flow diagram of a method implemented by a multipath device driver to create a multipath device, according to an embodiment of the invention. In the context of the information processing system 100 of FIG. 1, the operating system of the host system 110 issues a command to the multipath device driver 120 to commence a process to instantiate a multipath device (block 200). In response to the command, the core multipath device driver module 140 sends a request to the thin multipath device driver module 130 to create the specified multipath device (block 202). The thin multipath device driver module 130 searches for the specified multipath device in a list of multipath devices (block 204). The multipath device list comprises an array of data structures which comprise information regarding currently existing multipath devices. The multipath device list comprises an up-to-date list of multipath devices, which is updated when new multipath devices are instantiated or when existing multipath devices are terminated.

If the specified multipath device is found in the multipath device list (affirmative determination in block 206), the thin multipath device driver module 130 will return a reference to the specified multipath device found in the list (block 208). The core multipath device driver module 140 will then update a mapping data structure maintained in the core multipath device driver module 140, which comprises a mapping of multipath devices to native devices, and then update a copy of the current mapping data structure in the thin multipath device driver module 130 (block 212). On the other hand, if the specified multipath device is not found in the multipath device list (negative determination in block 206), the thin multipath device driver module 130 will create a new multipath device and generate associated data structures based on the new multipath device (block 210). The mapping data structures are then updated in the core and thin multipath device driver modules (block 212).

Figure 3:
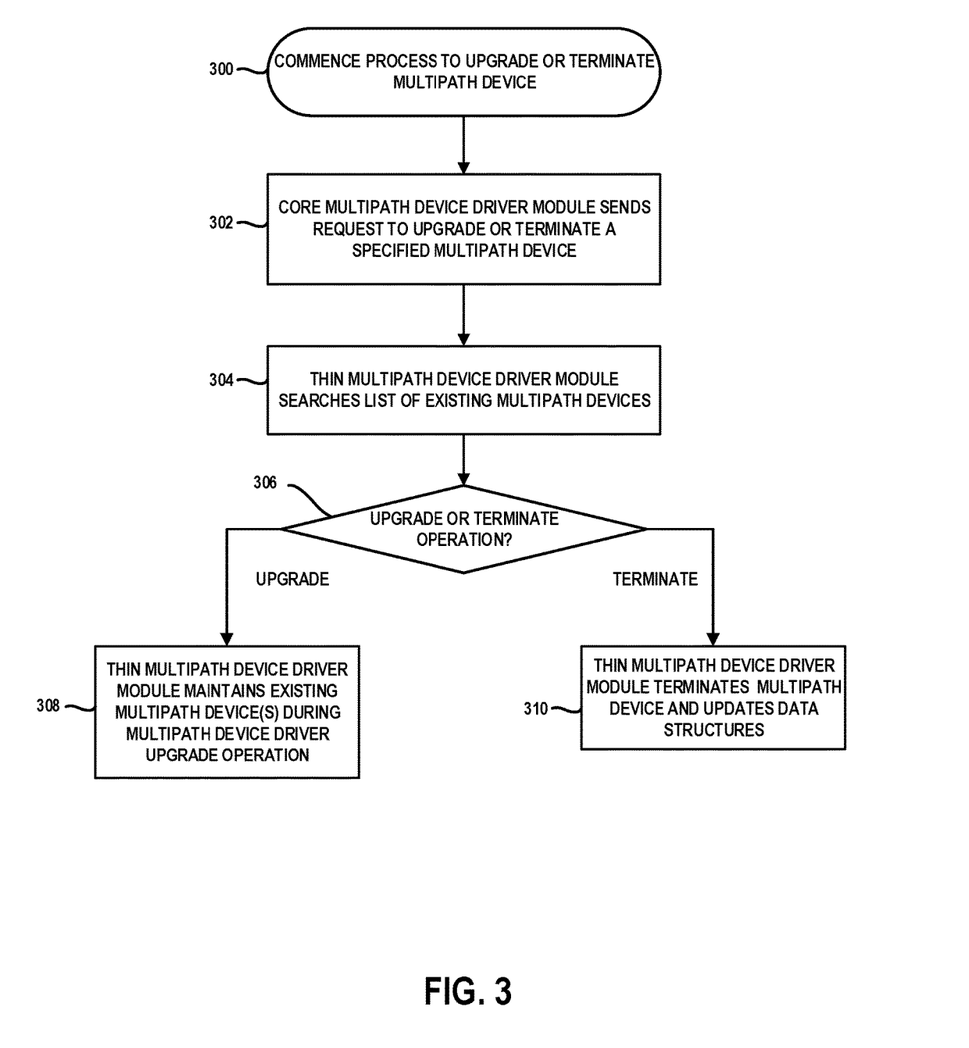
FIG. 3 is a flow diagram that illustrates methods implemented by a multipath device driver for managing a multipath device when performing an upgrade operation or an unload operation, according to an embodiment of the invention.

FIG. 3 is a flow diagram that illustrates methods implemented by a multipath device driver for managing a multipath device when performing an upgrade operation or an unload operation, according to an embodiment of the invention. In the context of the information processing system 100 of FIG. 1, the operating system of the host system 110 issues a command to the multipath device driver 120 to commence a process to upgrade the multipath device driver 120 or to terminate an existing multipath device (block 300). In response to the command, the core multipath device driver module 140 sends a request to the thin multipath device driver module 130 to either upgrade the multipath device driver module or to terminate an existing multipath device (block 302). The thin multipath device driver module 130 accesses and searches the list of existing multipath devices (block 304).

If the request is determined (in block 306) to be an upgrade operation, the thin multipath device driver module 130 will identify the existing multipath device instances from the list and maintain the existing multipath device instances during the multipath device driver upgrade operation (block 308). The thin multipath device driver module 130 will then proceed with certain actions to support the upgrade operation, as discussed below with reference to FIG. 4. On the other hand, if the request is determined (in block 306) to be a multipath device termination request, the thin multipath device driver module 130 will terminate the specified multipath device, and then update the multipath device list, and the associated data structures (block 310).

Figure 4:
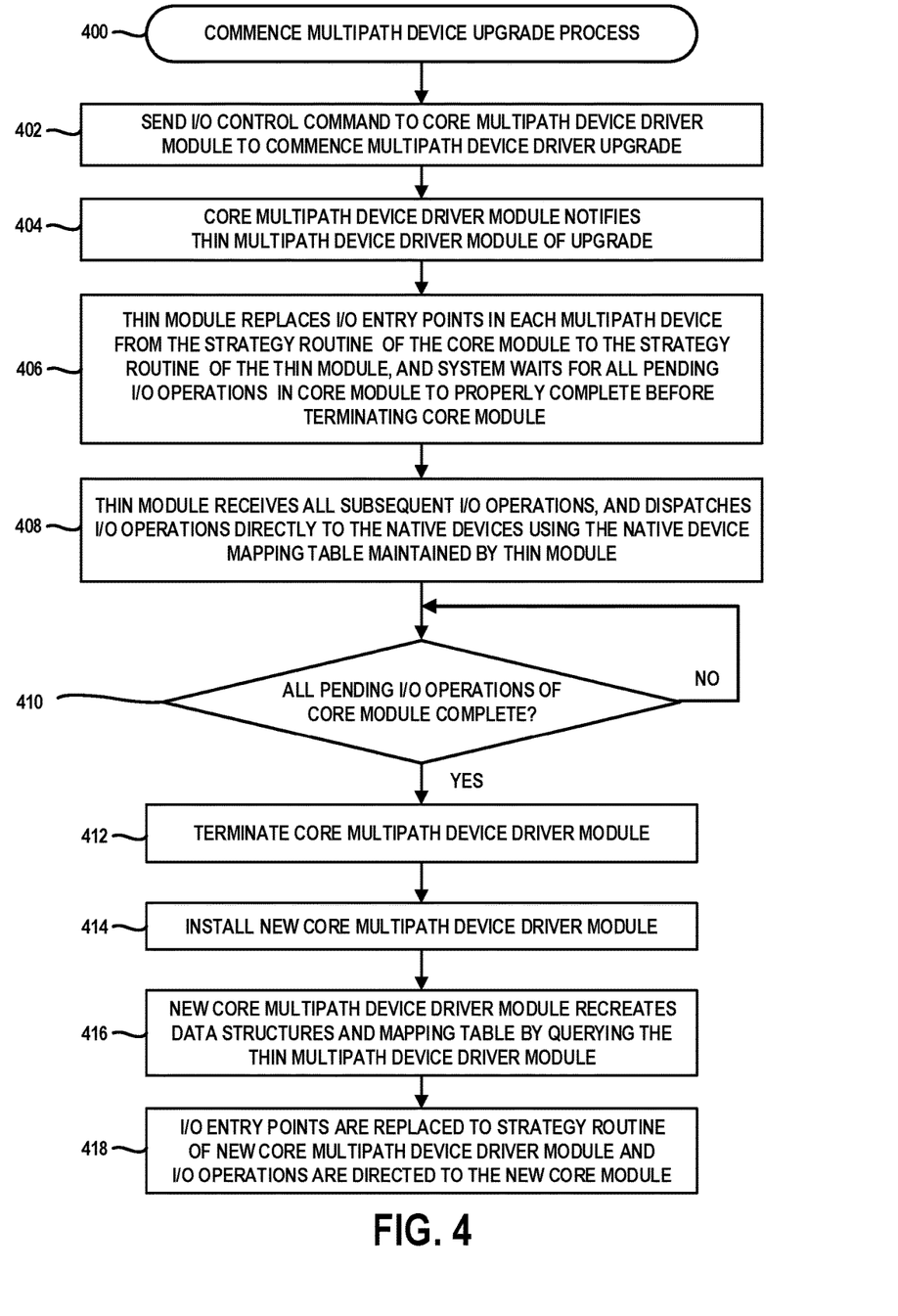
FIG. 4 is a flow diagram of a method for upgrading a multipath device driver, according to an embodiment of the invention.

FIG. 4 is a flow diagram of a method for upgrading a multipath device driver module, according to an embodiment of the invention. In the context of the information processing system 100 of FIG. 1, the operating system of the host system 110 issues a command to the multipath device driver 120 to commence an upgrade process (block 400). In response to the command, the multipath device driver 120 sends an I/O control command to the core multipath device driver module 140 to commence the upgrade process (block 402). The core multipath device driver module 140 sends an upgrade notification/request to the thin multipath device driver module 130 (block 404).

In response to the upgrade notification, the thin multipath device driver module 130 accesses the list of currently existing multipath devices, replaces the I/O entry points in each existing multipath device from the strategy routine of the core multipath device driver 140 to the strategy routine of the thin multipath device driver module 130, and the system waits for all pending I/O operations in the core multipath device driver module 140 to properly complete before terminating the core multipath device driver module 140 (block 406). The thin multipath device driver module 130 will receive all subsequent I/O operations and dispatch the I/O operations directly to the native devices using the native device mapping table 134 maintained by the thin multipath device driver module 130 (block 408). In one embodiment, during the upgrade operation, the thin multipath device driver module 130 provides basic multipathing functions such as round robin I/O distribution and redirecting I/Os in the case of path failures, etc.

When all pending I/O operations in the core multipath device driver module 140 are properly completed (affirmative determination in block 410), the existing core multipath device driver module 140 will be terminated and unloaded (block 412). Despite the core multipath device driver module 140 being unloaded, the multipath device(s) existing at the time of the upgrade process are maintained and utilized by the thin multipath device driver module 130 and, consequently, the I/O operations are continued (and not suspended) during the upgrade process. A new core multipath device driver module for the multipath device driver 120 is then installed under operation of the host operating system (block 414).

When loaded and executed for the first time, the newly installed core multipath device driver module will recreate the requisite data structures, and mapping tables, by querying the thin multipath device driver module 130 for the information needed to recreate the data structures and mapping tables (block 416). The newly installed core multipath device driver module will not create new multipath devices, but rather use the multipath devices existing prior to the upgrade process. In particular, the I/O entry points of the existing multipath devices are replaced to the strategy routine of the new multipath device driver module, and all new I/O requests will be processed directly by the new core multipath device driver module which provides full multipathing functionality (block 418).

Figure 5:
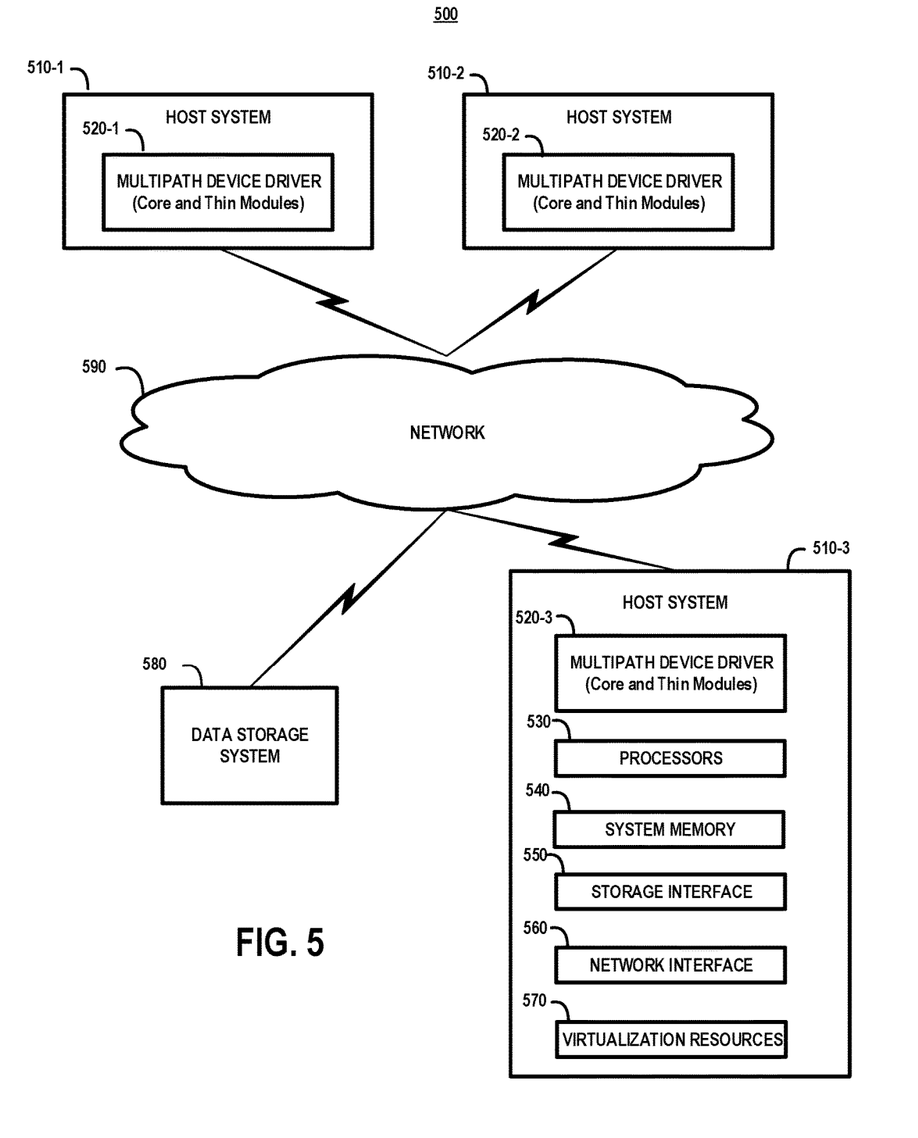
FIG. 5 schematically illustrates a distributed computing system comprising a plurality of host systems which are configured to enable non-disruptive upgrades of multipath device drivers, according to an embodiment of the invention.

FIG. 5 schematically illustrates a distributed computing system 500 comprising a plurality of host systems which are configured to enable non-disruptive upgrades of multipath device drivers, according to an embodiment of the invention. While FIG. 1 illustrates an information processing system comprising a single host system 110 connected to a data storage system 190, the exemplary embodiment of FIG. 5 illustrates a cloud based system or data center implementation wherein multiple host systems 510-1, 510-2, and 510-3 (collectively, host systems 510) are connected to a data storage system 580 through a network 590. The data storage system 580 is implemented using the same or similar data storage devices and storage control protocols as the data storage system 190 of FIG. 1.

The network 590 may comprise any known communication network such as, a global computer network (e.g., the Internet), a wide area network (WAN), a local area network (LAN), a satellite network, a cable network, a SAN, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 590 in some embodiments comprises a combination of multiple different types of communications networks each comprising network devices configured to communicate using Internet Protocol (IP) or other related communication protocols. The network 590 comprises intermediate points (such as routers, switches, etc.) and other elements that form a network backbone to establish communication paths and enable communication between network endpoints.

The host systems 510-1, 510-2, and 510-3 comprises respective multipath device driver modules 520-1, 520-2, and 520-3, which comprise core and thin driver modules as discussed above, and which implement the same or similar functionalities as discussed above to enable access to the data storage system 580 through multiple I/O paths. The host systems 510-1, 510-2, and 510-3 each comprise processors 530, system memory 540, a storage interface 550, a network interface 560, and virtualization resources 570. Applications and native operating systems executing on the host systems 510 are loaded into the system memory 540 and executed by the processors 530 to perform various functions as described herein. In this regard, the system memory 540 and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 530 are configured to process program instructions and data to execute a native operating system and applications that run on the host systems 510. For example, the processors 530 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The system memory 540 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 530 to execute a native operating system and one or more applications hosted by the host systems 510, and to temporarily store data that is utilized and/or generated by the native OS and application programs running on the host system 510. For example, the system memory 540 may comprise a dynamic random-access memory (e.g., DRAM) or other forms of volatile RAM, or a non-volatile memory (e.g., storage-class memory (SCM)) that is accessible as a memory resource such as NAND Flash storage device, a SSD storage device, or other types of next generation low-latency non-volatile, byte-addressable memory devices. The storage interface circuitry 550 and network interface circuitry 560 implement the same or similar functions, protocols, architectures, etc., as the storage interface driver 150, I/O adapter device driver 160, and physical I/O adapters 170 as discussed above.

The virtualization resources 570 can be instantiated to execute one or more applications or functions which are hosted by the host systems 510. For example, in one embodiment, the virtualization resources 570 comprise virtual machines that are implemented using a hypervisor platform which executes on the host system 510, wherein one or more virtual machines can be instantiated to execute functions of the host system 510. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the host system 510, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 570 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the host computing system 500. In yet another embodiment, containers may be used in combination with other virtualization infrastructure such as virtual machines implemented using a hypervisor, wherein Docker containers or other types of LXCs are configured to run on virtual machines in a multi-tenant environment.

It is emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, processors, memories, controllers, switches, storage devices and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

We claim:

1. A method, comprising:

running a multipath device driver on a host system, wherein the multipath device driver comprises a core multipath device driver module and a thin multipath device driver module, wherein the core multipath device driver module is configured to implement all multipathing functionality of the multipath device driver during a first mode of operation of the multipath device driver, and wherein the thin multipath device driver module is configured to create and maintain an instance of a multipath device, which is utilized by the core multipath device driver module during the first mode of operation of the multipath device driver to control input/output (I/O) operations over a plurality of I/O paths from the host system to an array of data storage devices of a data storage system;

routing an I/O request, which is received by the instance of the multipath device during the first mode of operation of the multipath device driver, to the core multipath device driver module for handling the received I/O request;

receiving, by the multipath device driver, an upgrade command to initiate a second mode of operation to upgrade the core multipath device driver module;

sending an upgrade notification from the core multipath device driver module to the thin multipath device driver module, in response to the upgrade command received by the multipath device driver;

responsive to the upgrade notification, the thin multipath device driver module replacing I/O entry points of the core multipath device driver module so that I/O requests received by the instance of the multipath device are routed to the thin multipath device driver module during the second mode of operation of the multipath device driver; and routing an I/O request, which is received by the instance of the multipath device during the second mode of operation of the multipath device driver, to the thin multipath device driver module for handling the received I/O request.

2. The method of claim 1, wherein the instance of the multipath device is maintained and utilized during and after the upgrade.

3. The method of claim 1, further comprising maintaining, by the thin multipath device driver module, a data structure which comprises a mapping of the instance of the multipath device to individual block devices that represent each I/O path of the plurality of I/O paths from the host system to the array of data storage devices.

4. The method of claim 1, further comprising:
enabling the core multipath device driver module to complete all pending I/O operations that are pending at a start of the upgrade;
unloading the core multipath device driver module when all pending I/O operations are complete; and
loading an upgraded core multipath device driver module.

5. The method of claim 1, wherein the thin multipath device driver module replaces the I/O entry points of the core multipath device driver module by replacing the I/O entry points in the instance of the multipath device from a strategy routine of the core multipath device driver module to a strategy routine of the thin multipath device driver module.

6. The method of claim 1, further comprising:
loading an upgraded core multipath device driver module of the multipath device driver;
accessing, by the upgraded core multipath device driver module, information from the thin multipath device driver module which enables the upgraded core multipath device driver module to create a data structure which comprises a mapping of the instance of the multipath device to the individual block devices that represent each I/O path of the plurality of I/O paths from the host system to the array of data storage devices;
replacing, by the upgraded core multipath device driver module, the I/O entry points of the instance of the multipath device so that I/O requests are routed from the instance of the multipath device to the upgraded core multipath device driver module after completion of the upgrade; and
routing an I/O request, which is received by the instance of the multipath device after completion of the upgrade, to the upgraded core device driver module for handling the received I/O request.

7. The method of claim 1, further comprising:
sending a request from the core multipath device driver module to the thin multipath device driver module to create a new instance of a multipath device;
creating, by the thin multipath device driver module, the new instance of the multipath device; and
utilizing the new instance of the multipath device, by the core multipath device driver module, to control the I/O operations over the plurality of I/O paths from the host system to the array of data storage devices of the data storage system.

8. A computer program product comprising a non-transitory processor-readable storage medium having stored therein program code of one or more software programs, wherein the program code, when executed by computing device, implements a process comprising:
running a multipath device driver on a host system, wherein the multipath device driver comprises a core multipath device driver module and a thin multipath device driver module, wherein the core multipath device driver module is configured to implement all multipathing functionality of the multipath device driver during a first mode of operation of the multipath device driver, and wherein the thin multipath device driver module is configured to create and maintain an instance of a multipath device, which is utilized by the core multipath device driver module during the first mode of operation of the multipath device driver to control input/output (I/O) operations over a plurality of I/O paths from the host system to an array of data storage devices of a data storage system;
routing an I/O request, which is received by the instance of the multipath device during the first mode of operation of the multipath device driver, to the core multipath device driver module for handling the received I/O request;
receiving, by the multipath device driver, an upgrade command to initiate a second mode of operation to upgrade the core multipath device driver module;
sending an upgrade notification from the core multipath device driver module to the thin multipath device driver module, in response to the upgrade command received by the multipath device driver;
responsive to the upgrade notification, the thin multipath device driver module replacing I/O entry points of the core multipath device driver module so that I/O requests received by the instance of the multipath device are routed to the thin multipath device driver module during the second mode of operation of the multipath device driver; and
routing an I/O request, which is received by the instance of the multipath device during the second mode of operation of the multipath device driver, to the thin multipath device driver module for handling the received I/O request.

9. The computer program product of claim 8, wherein the instance of the multipath device is maintained and utilized during and after the upgrade.

10. The computer program product of claim 8, wherein the process further comprises maintaining, by the thin multipath device driver module, a data structure which comprises a mapping of the instance of the multipath device to individual block devices that represent each I/O path of the plurality of I/O paths from the host system to the array of data storage devices.

11. The computer program product of claim 8, wherein the process further comprises:
enabling the core multipath device driver module to complete all pending I/O operations that are pending at a start of the upgrade;
unloading the core multipath device driver module when all pending I/O operations are complete; and
loading an upgraded core multipath device driver module.

12. The computer program product of claim 8, wherein the thin multipath device driver module replaces the I/O entry points of the core multipath device driver module by replacing the I/O entry points in the instance of the multipath device from a strategy routine of the core multipath device driver module to a strategy routine of the thin multipath device driver module.

13. The computer program product of claim 8, wherein the process further comprises:
loading an upgraded core multipath device driver module of the multipath device driver;
accessing, by the upgraded core multipath device driver module, information from the thin multipath device driver module which enables the upgraded core multipath device driver module to create a data structure which comprises a mapping of the instance of the multipath device to the individual block devices that represent each I/O path of the plurality of I/O paths from the host system to the array of data storage devices;

replacing, by the upgraded core multipath device driver module, the I/O entry points of the instance of the multipath device so that I/O requests are routed from the instance of the multipath device to the upgraded core multipath device driver module after completion of the upgrade; and routing an I/O request, which is received by the instance of the multipath device after completion of the upgrade, to the upgraded core device driver module for handling the received I/O request.

14. The computer program product of claim 8, wherein the process further comprises:

sending a request from the core multipath device driver module to the thin multipath device driver module to create a new instance of a multipath device;

creating, by the thin multipath device driver module, the new instance of the multipath device; and utilizing the new instance of the multipath device, by the core multipath device driver module, to control the I/O operations over the plurality of I/O paths from the host system to the array of data storage devices of the data storage system.

15. A system comprising:

a host system; and a data storage system comprising an array of data storage devices which are configured to communicate over one or more networks with the host system;

wherein the host system comprises a multipath device driver, wherein the multipath device driver comprises a core multipath device driver module and a thin multipath device driver module, wherein the core multipath device driver module is configured to implement all multipathing functionality of the multipath device driver during a first mode of operation of the multipath device driver, and wherein the thin multipath device driver module is configured to create and maintain an instance of a multipath device, which is utilized by the core multipath device driver module during the first mode of operation of the multipath device driver to control input/output (I/O) operations over a plurality of I/O paths from the host system to an array of data storage devices of a data storage system;

wherein the multipath device driver is configured to:

route an I/O request, which is received by the instance of the multipath device during the first mode of operation of the multipath device driver, to the core multipath device driver module for handling the received I/O request;

receive, by the multipath device driver, an upgrade command to initiate a second mode of operation to upgrade the core multipath device driver module;

responsive to the upgrade notification, replace, by the thin multipath device driver module, I/O entry points of the core multipath device driver module so that I/O requests received by the instance of the multipath device are routed to the thin multipath device driver module during the second mode of operation of the multipath device driver; and route an I/O request, which is received by the instance of the multipath device during the second mode of operation of the multipath device driver, to the thin multipath device driver module for handling the received I/O request.

16. The system of claim 15, wherein the instance of the multipath device is maintained and utilized during and after the upgrade.

17. The system of claim 15, wherein the multipath device driver is further configured to maintain, by the thin multipath device driver module, a data structure which comprises a mapping of the instance of the multipath device to individual block devices that represent each I/O path of the plurality of I/O paths from the host system to the array of data storage devices.

18. The system of claim 15, wherein the multipath device driver is further configured to:

enable the core multipath device driver module to complete all pending I/O operations that are pending at a start of the upgrade;

unload the core multipath device driver module when all pending I/O operations are complete; and load an upgraded core multipath device driver module.

19. The system of claim 15, wherein the thin multipath device driver module replaces the I/O entry points of the core multipath device driver module by replacing the I/O entry points in the instance of the multipath device from a strategy routine of the core multipath device driver module to a strategy routine of the thin multipath device driver module.

20. The system of claim 15, wherein the multipath device driver is further configured to:

load an upgraded core multipath device driver module of the multipath device driver;

access, by the upgraded core multipath device driver module, information from the thin multipath device driver module which enables the upgraded core multipath device driver module to create a data structure which comprises a mapping of the instance of the multipath device to the individual block devices that represent each I/O path of the plurality of I/O paths from the host system to the array of data storage devices;

replace, by the upgraded core multipath device driver module, the I/O entry points of the instance of the multipath device so that I/O requests are routed from the instance of the multipath device to the upgraded core multipath device driver module after completion of the upgrade; and route an I/O request, which is received by the instance of the multipath device after completion of the upgrade, to the upgraded core device driver module for handling the received I/O request;

utilize, by the upgraded core multipath device driver module, the instance of the multipath device to execute the I/O operation requests that are routed to the upgraded core multipath device driver module.

* * * * *